United States Patent [19]
Kress et al.

[11] Patent Number: 4,861,829
[45] Date of Patent: Aug. 29, 1989

[54] THERMOPLASTIC POLYCARBONATE MOULDING MATERIALS

[75] Inventors: Hans-Jürgen Kress; Winfried Paul, both of Pittsburgh, Pa.; Horst Peters, Leverkusen, Fed. Rep. of Germany; Christian Lindner, Cologne, Fed. Rep. of Germany; Josef Buekers, Krefeld, Fed. Rep. of Germany

[73] Assignee: Bayer Aktiengesellschaft, Leverkusen, Fed. Rep. of Germany

[21] Appl. No.: 174,071

[22] Filed: Mar. 28, 1988

Related U.S. Application Data

[63] Continuation-in-part of Ser. No. 933,250, Nov. 21, 1986, abandoned.

[30] Foreign Application Priority Data

Dec. 6, 1985 [DE] Fed. Rep. of Germany ....... 3543119
Nov. 20, 1986 [EP] European Pat. Off. ........... 86116069
Nov. 27, 1986 [JP] Japan ................................ 61-280914

[51] Int. Cl.$^4$ .................. C08L 69/00; C08L 83/10
[52] U.S. Cl. .................................. 525/92; 525/101; 525/146; 524/505
[58] Field of Search .................. 525/92, 101, 146

[56] References Cited

U.S. PATENT DOCUMENTS 3,862,998  1/1975  Kochler et al. ............... 525/148
4,569,970  2/1986  Paul et al. ..................... 525/92

Primary Examiner—Wilbert J. Briggs, Sr.
Attorney, Agent, or Firm—Connolly and Hutz

[57] ABSTRACT

The present invention relates to thermoplastic moulding materials from polydiorganosiloxane-polycarbonate block copolymers and copolymers from styrenes and maleic anhydride and, if appropriate, further conventional additives, and also a process for the preparation of these moulding materials.

10 Claims, No Drawings

THERMOPLASTIC POLYCARBONATE MOULDING MATERIALS

This application is a continuation-in-part-application of U.S. application Ser. No. 933,250, filed Nov. 21, 1986, and now abandoned.

The present invention relates to thermoplastic moulding materials comprising

A. 40–90 parts by weight, relative to the sum of the weight of A.+B., of polydiorganosiloxane-polycarbonate block copolymer, with an average molecular weight $\overline{M}_w$ of 10,000 to 200,000 and containing between 75% by weight and 99% by weight, preferably 85% by weight and 98% by weight of aromatic carbonate structural units and containing between 1% by weight and 25% by weight preferably 2% by weight and 15% by weight of diorganosiloxy units, the block copolymers, starting from $\alpha,\omega$-bis-hydroxyaryloxy terminal group-containing polydiorganosiloxanes, being prepared with a degree of polymerization $\overline{P}_n$ of from 5 to 100, preferably 20 to 80, B. 5–60 parts by weight, relative to the sum of the weight of A.+B., of a randomly constructed copolymer from 95–70% by weight, preferably 90–75% by weight, of styrene, $\alpha$-methylstyrene or nucleus-substituted styrenes or mixtures of the vinyl aromatics mentioned, and 5–30% by weight, preferably 10–25% by weight, of maleic anhydride, and also, if appropriate, effective amounts of stabilizers, pigments, flow agents, flameproofing agents, mould-release agents and/or antistatic agents.

Component A. can also be a mixture of polydioganosiloxane-polycarbonate block copolymers with conventional siloxane-free, thermoplastic polycarbonates, the total diorganosiloxy unit content in this polycarbonate mixture again being between 1% by weight and 25% by weight, preferably between 2% by weight and 15% by weight.

Alloys from 5–95% by weight of aromatic polycarbonates and 95–5% by weight of styrene-maleic anhydride copolymers having 5–30% by weight of copolymerized maleic anhydride are thermoplastic moulding materials which are clearly superior to the polycarbonates (DE-OS (German published specification) No. 2,252,974), to which they are similar in terms of most technological properties above all regarding stability towards hot water and also regarding flowability of the melts during thermoplastic processing.

However, a significant disadvantage of the alloys from aromatic polycarbonates and styrene-maleic anhydride copolymers is that, for some applications, for example in motor vehicle interiors or in the household sector, they have inadequate toughness, particularly notched impact strength.

This disadvantage can be overcome either by incorporation of graft rubber systems and/or polymer into the mixture of aromatic polycarbonates and styrene-maleic anhydride copolymers (see, for example, u.S. patent specifications Nos. 4,218,544, 4,393,169, JA 54/050,553 and JA 55/161,846) or by use of impact-resistant modified styrene-maleic anhydride copolymer (see, for example, DE-OS (German published specifications) Nos. 3,130,774, 3,206,184, EP-A 63,634, U.S. patent specifications Nos. 3,966,842 and 4,351,920). However, this only results in other disadvantages, for example poorer processability or less temperature stability, which is attributed to the rubber.

Blends of polydiorganosiloxane-polycarbonate block copolymers with graft polymers and with rubber-free, thermoplastic vinyl polymers are known from EP-OS (European published specification) No. 0,135,794 (Le A 22,390-EP). Copolymers of styrene with maleic anhydride are also possible as vinyl polymers (page 10 of the EP-OS (European published specification)). However, such moulding materials, as stated above, have disadvantages, particularly for large amounts, which can be attributed to the rubber component, such as low temperature stability or ductility which decreases with time, caused by ageing of the rubber, marked yellowing or browning also being possible. It has now been found that products having very high notched impact strength can be obtained merely by exclusive use of polydiorganosiloxane-polycarbonate block copolymers and styrene-maleic anhydride copolymers without rubber or graft polymer. In the composition according to the invention, they are distinguished by a high heat distortion resistance and good processability.

The polydiorganosiloxane-polycarbonate block copolymers to be employed according to the invention are either known from the literature (see, for example, U.S. patent specification No. 3,189,662, U.S. patent specification No. 3,419,634, DE-OS (German published specification) No. 3,334,782 (Le A 22,594) or EP-OS (European published specification) No. 0,122,535 (Le A 22,594-EP) and EP-OS (European published specification) No. 0,135,794 (Le A 22,390-EP) or, if prepared with simultaneous use of specific chain terminators, are described in German patent specification No. P 3,506,472.2 (Le A 23,654).

The improved mechanical properties at low temperatures of the polydiorganosiloxane-polycarbonate block copolymers which are known from the literature are described in the relevant literature (e.g. B. M. Beach, R. P. Kambour and A. R. Schultz, J. Polym. Sci., Polym. Lett. Ed. 12, 247 (1974)).

The block copolymers according to component A. which are to be employed according to the invention are those based on diphenols of the formula (I)

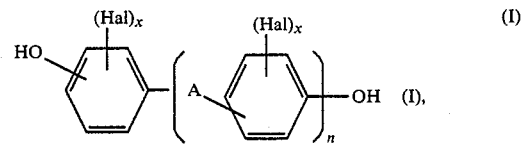

in which
"A" is a single bond, a $C_1$–$C_5$-alkylene, a $C_2$–$C_5$-alkylidene, a $C_5$–$C_6$-cycloalkylidene, —S— or —$SO_2$—, Hal is chlorine or bromine, "x" is 0, 1 or 2 and "n" is 1 or zero, and of the formula (Ia)

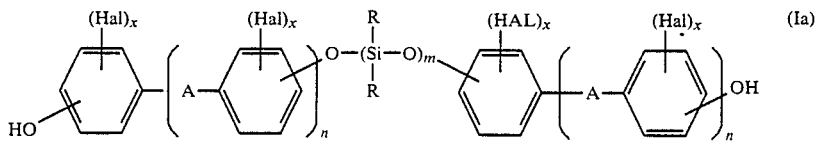

in which "A", Hal, "x" and "n" have the meaning stated for formula (I), and the Rs are identical or different and are a linear $C_1-C_{20}$-alkyl, branched $C_3-C_{20}$-alkyl or $C_6-C_{20}$-aryl, preferably $CH_3$, and "m" is an integer between 5 and 100, preferably between 20 and 80, the proportion by weight of diphenols of the formula (Ia) in the copolycarbonates being proportioned in each case in such a manner that the copolycarbonate contains between 1% by weight and 25% by weight, preferably between 2% by weight and 15% by weight, of diorganosiloxy units

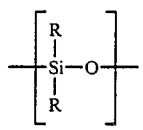

The diphenols of the formula (I) are either known from the literature or can be prepared by processes which are known from the literature: polydiorganosiloxanes according to the formula (Ia) having terminal hydroxyaryloxy groups are also known (see, for example U.S. patent specification No. 3,419,634) or can be prepared by processes which are known from the literature.

The preparation of the polycarbonates according to component A which are suitable according to the invention is known from the literature and can be carried out, for example, by the phase boundary method using phosgene or by the process in a homogenous phase (the so-called pyridine process) using phosgene, the molecular weight to be produced in each case is achieved in a known fashion by using an appropriate amount of known chain terminators (see, for example, DE-OS (German published specification) No. 3,334,782 (Le A 22,594)).

Suitable chain terminators are, for example, phenol, p-chlorophenol, p-tert.-butylphenol and 2,4,6-tribromophenol.

In addition, the preparation of block copolymers using monoalkyl phenols or dialkyl phenols having a total of 8 to 20 C atoms in the alkyl substituents is described in German patent application No. P 35 06 472.2, examples of chain terminators which are mentioned being p-isooctylphenol, p-nonylphenol, 3,5-di-tert.-butyl-phenol, p-tert.-octyl-phenol, p-dodecyl-phenol, 2-(3,5-dimethyl-heptyl)-phenol and 4-(3,5-dimethyl-heptyl)-phenol.

The amount of chain terminators to be employed is, in general, between 0.5 mol % and 10.0 mol %, relative to the sum of the diphenols (I) and (Ia) employed in each case.

The polycarbonates according to component A which are suitable according to the invention have weight average molecular weights ($\overline{M}_w$, measured, for example, by means of ultracentrifuging or scattered light measurement) of 10,000 to 200,000, preferably from 20,000 to 80,000.

Examples of suitable diphenols of the formula (I) are hydroquinone, resorcinol, 4,4'-dihydroxydiphenyl, 2,2-bis-(4-hydroxyphenyl)-propane, 2,4-bis-(4-hydroxyphenyl)-2-methyl-butane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Suitable diphenols of the formula (Ia) are those in which R is methyl, ethyl, propyl, n-butyl, tert.-butyl and phenyl.

Preferred diphenols of the formula (Ia) are those of the formula (Ib)

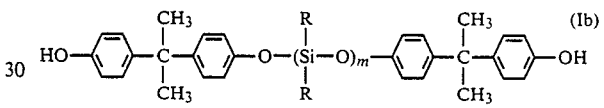

in which the Rs are identical and have the abovementioned meaning, that is to say denote methyl etc. and phenyl, and "m" is again an integer between 5 and 100, preferably between 20 and 80.

The diphenols of the formula (Ia) can be prepared, for example, from the corresponding bis-chloro compounds (II)

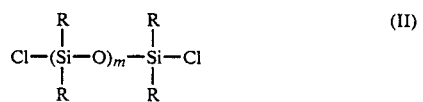

and the diphenols (I), for example accordig to U.S. patent specification No. 3,419,634, column 3, together with U.S. patent specification No. 3,182,662.

In the bis-chloro compounds (II), R and "m" have the meaning as in the diphenols (Ia) or (Ib).

The polycarbonates according to component A which are suitable according to the invention can be branched in a known manner, to be precise preferably by incorporation of 0.05 to 2.0 mol %, relative to the sum of the diphenols employed, of tri- or more than tri-functional compounds, for example those having three or more than three phenolic OH groups.

The styrene-maleic anhydride copolymers according to component B. which are suitable according to the invention are constructed randomly. Such randomly constructed copolymers can preferably be prepared by means of a continuous mass or solution polymerization from the corresponding monomers with incomplete conversion.

The polymers can also contain nuclear-substituted styrenes, such as p-methyl styrene, vinyl toluene, 2,4-dimethyl styrene and/or other substituted styrenes, such as α-methyl styrene, in place of styrene.

The molecular weights of the randomly constructed styrene-maleic anhydride copolymers according to component B. which are suitable according to the invention can vary within a wide range. A limiting viscosity number [η] of 0.3–0.9 (measured in dimethylformamide at 25° C.; in this context, see Hoffmann, Krömer, Kuhn, Polymeranalytik [Polymer Analysis] I, Stuttgart 1977, page 316 et seq.) is preferred for these products.

The thermoplastic moulding materials according to the invention can contain further additives, such as stabilizers, pigments, flow agents, flameproofing agents, mould release agents and/or antistatic agents, which are known for polycarbonates or for styrene-maleic anhydride copolymers.

The moulding materials according to the invention, comprising the components A., B. and, if appropriate, further known additives, such as stabilizers, pigments, flow agents, flameproofing agents, moulding release agents and/or antistatic agents, are prepared by mixing the respective components in a known fashion and compounding or extruding the melt at temperatures from 220° to 330° C. in conventional equipment such as internal mixers or single- or twin-screw extruders, or by mixing the solutions of the respective components in suitable organic solvents, for example in chlorobenzene, and concentrating the mixture of solutions in conventional equipment, for example in evaporation extruders.

The present invention thereof also relates to a process for the preparation of thermoplastic moulding materials, comprising the components A., B. and, if appropriate, stabilizers, pigments, flow agents, flame-proofing agents, mould release agents and/or antistatic agents, which is characterized in that the components A., B. and also, if appropriate, stabilizers, pigments, flow agents, flameproofing agents, mould release agents and/or antistatic agents are compounded or extruded as melts at temperatures from 220° to 330° C. in conventional equipment after mixing, or in that the solutions of these components in suitable organic solvents are concentrated in conventional equipment after mixing.

The moulding materials of the present invention can be used for the manufacture of moulded articles of any type. In particular, moulded articles can be manufactured by injection moulding. Examples of moulded articles which can be manufactured are: housing parts of any type (for example for household equipment such as coffee machines or mixers) or access panels for the construction industry and parts for the motor vehicle industry. In addition, they are employed in electrical engineering, because they possess very good electrical properties.

A further form of processing is the manufacture of moulded articles by deep-drawing or thermoforming of sheets or films which have previously been produced by extrusion.

EXAMPLES

Alloy components employed.

A.1

A copolycarbonate, based on bisphenol A, having 5% by weight of polydimethylsiloxane with block length ($\overline{P}_n$) 40, having a relative solution viscosity of 1.31, measured in $CH_2Cl_2$ at 25° C. and a concentration of 0.5% by weight, prepared using phenol as chain terminator according to DE-OS (German published specification) No. 3,334,782 (Le A 22,594).

A.2

Homopolycarbonate based on bisphenol A having a relative solution viscosity of 1.32, measured in $CH_2Cl_2$ at 25° C. and a concentration of 0.5% by weight, prepared using phenol as chain terminator. Preparation of the copolymer resins B.

750 parts of a mixture having a composition according to table 1 are initially introduced into a jacketed vessel which is fitted with internal thermometer, stirrer, inlet and outlet, and heated to 130° C. A stream of 110 parts of the same composition of monomer is then metered in and the same amount of polymer solution is simultaneously removed from the vessel, so that the amount contained in the vessel is maintained. About 0.5 part/h of tert.-butylperpivalate (75% strength in dibutylphthalate) is added continuously to the monomer stream. After about 2 hours, a constant conversion rate of about 40% has been produced. 0.1% by weight of 2,6-di-t-butyl-p-cresol is added to the polymer solution, which is subsequently freed from monomers and volatile components on an evaporation extruder.

The components A. and B. are compounded on a 3 liter internal kneader at temperatures between 200° and 220° C. or on a type ZSK 53 twin-screw extruder (Werner and Pfleiderer) at a temperature of 240° C.

The moulded articles were manufactured on an injection moulding machine at 260° C.

The Vicat (method B) heat distortion resistance was determined according to DIN 53 460.

TABLE 1

Composition of the monomers employed and of the copolymers B

| | Monomers employed (% by weight) styrene | maleic anhydride | Copolymer (% by weight) styrene | maleic anhydride | Limiting viscosity number of the copolymer |
|---|---|---|---|---|---|
| B 1 | 93.8 | 6.2 | 84.5 | 15.5 | 0.514 |
| B 2 | 93.2 | 6.8 | 83 | 17 | 0.518 |

The Izod impact strength was determined on rods measuring 2.5×½×1/8" according to ASTM-D-256 or in accordance with DIN 53,453/ISO R 179 on rods measuring 50×6×4 mm, the rods being provided with a V-shaped notch of depth of 2.7 mm for the notched impact strength.

The flowability was assessed via the injection pressure (cf: Johannaber, Kunststoffe [Plastics] 74 (1984), 1; p. 1–5) necessary in the injection moulding machine (bulk temperature: 260° C.) for the preparation of rods measuring 2.5×½×1/8".

The exact compositions of the moulding materials tested and also the test data obtained can be gathered from the table which follows.

As the table shows, polycarbonate/SMA blends possess a clearly better flowability compared to pure polycarbonate with an only slightly worse heat distortion resistance. A comparison of the experiments according to the invention with the comparison batches shows that good notched impact strength is only achieved with a polydiorganosiloxane-polycarbonate block copolymer, blends containing 50% of this product still producing toughnesses for which amounts of 80% of bisphenol-A-polycarbonate in the blend are necessary when pure bisphenol-A-polycarbonate is used.

Differences between pure bisphenol-A-polycarbonate and polydiorganosiloxane-polycarbonate block polymer are no longer found for contents of <40% of polycarbonate. In both cases, only an unsatisfactory level is achieved.

TABLE 2

| | | Experiments according to the invention | | | | | | | | Comparison experiments | | |
|---|---|---|---|---|---|---|---|---|---|---|---|---|
| A.1 | % | 50 | 90 | 80 | 80 | 100 | | | | | 35 | |
| A.2 | " | | | | | | 100 | 90 | 80 | 80 | | 35 |
| B.1 | " | 50 | | | | | | | | | 65 | 65 |
| B.2 | " | | 10 | 20 | 20 | | | 10 | 20 | 20 | | |
| Notched impact strength (DIN) | | | | | | | | | | | | |
| Room temp. | kJ/m$^2$ | 17.3 | | | 31 | | | | | 18 | 4.1 | 2.4 |
| −40° C. | " | 9.5 | | | 37 | | | | | | | |
| Notched impact strength (Izod) | | | | | | | | | | | | |
| Room temp. | J/m | | 786 | 752 | | 973 | 1006 | 285 | 255 | 241 | | |
| −20° C. | " | | 611 | 635 | | 836 | 374 | 184 | 132 | | | |
| −40° C. | " | | 362 | 586 | | 732 | | | | | | |
| Heat distortion resistance | | | | | | | | | | | | |
| (Vicat-B) | °C. | 138 | 145 | 145 | 142 | 147 | 153 | 151 | 148 | 145 | 136 | 136 |
| Injection pressure (260° C.) | bar | | 218 | 187 | | 287 | 339 | 237 | 155 | | | |
| Compounding (Mixer = 1; extruder = 2) | | 2 | 1 | 1 | 2 | 1 | 1 | 1 | 1 | 2 | 2 | 2 |

The mixtures according to instant invention are optically homogeneous and transparent whereas those of U.S. Pat. No. 4,569,970 are not transparent but turpid due to the presence of the graft polymer component. Thus the mixtures according to instant invention are useful as optical devices whereas the mixtures of U.S. Pat. No. 4,569,970 are not useful as optical devices. This could not be foreseen because it was not evident from the teaching of U.S. Pat. No. 4,569,970 that the mixtures of instant invention would be absolutely compatible.

In order to demonstrate this two samples have been prepared as follows:

Sample 1 is that of instant invention consisting of (A) 70% copolycarbonate according to component (A1) of instant u.S. specification and of (B) 30% styrene maleic anhydride copolymer according to instant U.S. specification having a content of maleic acid anhydride of 13% by weight.

Sample 2 contains additionally graft polymer (C). The component (C) is a graft polymer prepared by emulsion polymerisation of 50% by weight of styrene/acrylonitril mixture (weight ratio 72:28) on 50% by weight of polybutadiene having an average particle size of 0, 4 μm (d50). The amount of graft polymer (C) is 5% by weight in addition to the 100% by weight of (A)+(B).

Sample 1 is transparent, Sample 2 is turbid. Both samples are already deposited in the file of U.S. parent application Ser. No. 933,250 of the US-Patent Office.

We claim:

1. A thermoplastic moulding material consisting of
   A. 40 to 95 parts by weight, relative to the sum of the weight of A.+B., of polydiorganosiloxane-polycarbonate block copolymer, with an average molecular weight $\overline{M}_w$ of 10,000 to 200,000 and containing between about 75% by weight and 99% by weight of aromatic carbonate structural units and containing between 1% by weight and 25% by weight of diorganosiloxy units, the block copolymers, starting from α,ω-bishydroxy-aryloxy terminal group-containing polydiorganosiloxanes, being prepared with a degree of polymerization $P_n$ from 5 to 100, and
   B. 5 to 60 parts by weight, relative to the sum of the weight of A.+B., of a randomly constructed copolymer from 95 to 70% by weight of a vinyl aromatic selected from styrene, α-methylstyrene, nuclear-substituted styrenes and mixtures thereof, and 5 to 30% by weight of maleic anhydride.

2. A moulding material according to claim 1, in which the block copolymer of component A. is prepared with a degree of polymerisation $P_n$ of 20 to 80.

3. A moulding material according to claim 1, in which component A is a mixture of polydiorganosiloxane-polycarbonate block copolymers with other siloxane-free thermoplastic polycarbonates, the total content of diorganosiloxy units in this polycarbonate mixture again being between 1% and 25% by weight.

4. Moulding materials according to claim 1, in which component B. is constructed from 90 to 75% by weight of the vinyl aromatic and 10 to 25% by weight of maleic anhydride.

5. A moulding material according to claim 1, additionally comprising at least one additive selected from stabilizers, flow agents, flameproofing agents, mould release agents and antistatic agents.

6. A process for the production of a moulding material according to claim 1, in which the components A and B are mixed and the melt is compounded or extruded at a temperature from 220° to 330° C. in compounding or extrusion equipment.

7. A process for the production of a moulding material according to claim 1, in which solutions of components A and B are mixed in an organic solvent therefore and then the solution mixture is concentrated in appropriate evaporation equipment.

8. A process according to claim 6, in which at least one additive selected from stabilizers, flow agents, flameproofing agents, mould release agents and antistatic agents, is included in the mixture of components A and B.

9. A process according to claim 7, in which at least one additive selected from stabilizers, flow agents, flameproofing agents, mould release agents and antistatic agents, is included in the mixture of components A and B.

10. Optical device prepared by using a thermoplastic moulding material of claim 1.

* * * * *